United States Patent
Roizen et al.

(10) Patent No.: US 6,399,036 B1
(45) Date of Patent: Jun. 4, 2002

(54) USE OF SOLID HYDROXIDES AS SCAVENGING MATERIALS FOR CYANIDE GAS

(76) Inventors: Michael Roizen, 5622 S. Woodlawn; Jonathan Moss, 5827 S. Blackstone; Avery Tung, 5841 S. Maryland MC 4028, all of Chicago, IL (US) 60637

( * ) Notice: Subject to any disclaimer, the term of this patent is extended or adjusted under 35 U.S.C. 154(b) by 0 days.

(21) Appl. No.: 09/690,949

(22) Filed: Oct. 18, 2000

Related U.S. Application Data

(60) Provisional application No. 60/098,509, filed on Aug. 31, 1998.

(51) Int. Cl.[7] .............................. C01B 9/08; C01B 25/10; C01B 33/10; C01B 35/06
(52) U.S. Cl. ................... 423/236; 252/192; 422/177; 423/210; 423/239.1
(58) Field of Search ................... 423/210, 236, 423/239.1; 252/192; 422/177

(56) References Cited

U.S. PATENT DOCUMENTS

| | | | |
|---|---|---|---|
| 4,201,751 A | 5/1980 | Holter et al. | 423/210 |
| 4,206,186 A | 6/1980 | Holter et al. | 423/230 |
| 4,271,133 A | 6/1981 | Tellis | 423/230 |
| 4,313,916 A | 2/1982 | Jones, Jr. et al. | 423/226 |
| 5,169,615 A | 12/1992 | Jennings et al. | 423/377 |
| 5,602,295 A | 2/1997 | Abel et al. | 588/205 |
| 5,634,426 A | 6/1997 | Tomlinson et al. | 116/207 |
| 5,690,101 A | 11/1997 | Kutta | 128/205.27 |

FOREIGN PATENT DOCUMENTS

| | | |
|---|---|---|
| DE | 26 47 520 | 4/1978 |
| GB | 615346 | 1/1949 |

OTHER PUBLICATIONS

A. Harrestrup Andersen, "Adsorption Power of Charcoal in Aqueous Solutions", Acta Pharmacologica vol. 2, 69–74 (1946).
Simon J. Smith, PhD. The C2A1 Canister from Racal Filter Technologies Inc. 1997.
Lambert et al., The Efficacy of Superactivated Charcoal in Treating Rats Exposed to a Lethal Oral Dose of Potassium Cyanide; Annals of Emergency Medicine 17:6, 595–598, Jun. 1988.

Primary Examiner—Steven P. Griffin
Assistant Examiner—Maribel Medina
(74) Attorney, Agent, or Firm—Roberts, Abokhair & Mardula, LLC

(57) ABSTRACT

The present invention relates generally to the use of a combination of alkali metal hydroxides and alkaline-earth metal hydroxides as a scavenging material for cyanide gas. In particular, the present invention relates to a method and means for either filtering out cyanide gas or detoxifying areas contaminated with cyanide using Sodalime or Baralyme™. The scavenging material of the invention is typically incorporated into a scrubbing device wherein a motor (50) powers a fan (52) to draw contaminated air into an inlet (54) and across a filter (56) which contains the scavenger material, thereby absorbing cyanide gas contained in the air.

10 Claims, 5 Drawing Sheets

USE OF SOLID HYDROXIDES AS SCAVENGING MATERIALS FOR CYANIDE GAS

CROSS-REFERENCE TO RELATED APPLICATIONS

This application claims priority from PCT international application no. PCT/US/ 99/19953, filed Aug. 31, 1999, which claims priority from U.S. provisional application No. 60/098,509, filed Aug. 31, 1998. Both the PCT/US 99/19953 and 60/098,509 applications are incorporated herein by reference in their entirety for all purposes.

BACKGROUND OF THE INVENTION

1. Field of the Invention

The present invention relates generally to the use of a combination of alkali metal hydroxides and alkaline-earth metal hydroxides as a scavenging material for cyanide gas. In particular, the present invention relates to a method and means for either filtering out cyanide gas or detoxifying areas contaminated with cyanide using Sodalime or Baralyme™.

2. Background Information

Hydrogen cyanide gas (HCN) is a potent metabolic poison that acts by blocking cellular aerobic metabolism. Even brief exposures to HCN can be rapidly fatal in humans. Human exposure to HCN occurs upon inhalation of the smoke from fires, as well as from extensive cyanide use in industries such as metal finishing, fishing, and commercial gold mining. HCN gas is also a significant weapon in chemical warfare due to its potent ability to suppress cellular respiration.

Although an antidote exists, the rapid toxicity of cyanide gas often prevents effective treatment. The lethal exposure level for inhaled cyanide is 100 ppm. It is thus preferable to limit exposure to this poison.

The military standard for a portable air purification device is the C2A1 canister, currently produced by Racal Filter Technologies, Inc. for the U.S. Army. The C2A1 canister comprises a metal body which incorporates a high efficiency particulate filter, and a bed of activated impregnated carbon. Through physical adsorption with the activated charcoal, organic vapors such as nerve agents, mustard gases, and chloropicirin are removed. The activated carbon of the C2A1 canister is impregnated with salts of copper, zinc, molybdenum, and silver along with the organic chemical triethylenediamine. This mixture removes gases such as cyanogen chloride, hydrogen cyanide, phosgene and arsine.

A need however, continues to exist for a compound and/or compounds exhibiting improved scavenging of cyanide. In addition, activated charcoal has several properties, such as production of poisonous gases on combustion, which makes it unsuitable as a general spray or absorbent for cyanide-contaminated areas. Thus, a need also exists for a compound and/or compounds that is suitable as a general spray or absorbent for cyanide-contaminated areas.

SUMMARY OF THE INVENTION

It is therefore an object of the present invention to provide a filtering system for cyanide gas.

It is a further object of the present invention to provide a general scavenging material for detoxification of contaminated areas.

It is a still further object of the present invention to filter out cyanide gas with a portable, individual air purifier device such as a gas mask.

It is yet another object of the present invention to provide a spray or absorbent for cyanide contaminated areas.

Some of the above objects are obtained by a process for removing cyanide containing gas from air. The process includes providing a cyanide scavenging material, contacting the air with the cyanide scavenging material, and absorbing the cyanide containing gas with the cyanide scavenging material. The cyanide scavenging material is a combination comprising Calcium Hydroxide, Barium Hydroxide, and Potassium Hydroxide.

Others of the above objects are obtained by a composition of matter for removing cyanide containing gas from air. The composition is a combination of Sodalime with a composition that includes 73% Calcium Hydroxide, 11% Barium Hydroxide, and 5% Potassium Hydroxide.

Some of the above objects are also obtained by an apparatus for removing cyanide containing gas from air. The apparatus includes a cyanide scavenging material and a means for contacting the air with the cyanide scavenging material. The cyanide scavenging material is a combination that includes Calcium Hydroxide, Barium Hydroxide, and Potassium Hydroxide.

BRIEF DESCRIPTION OF THE DRAWINGS

Additional objects and advantages of the present invention will be apparent in the following detailed description read in conjunction with the accompanying drawing figures.

DETAILED DESCRIPTION OF THE INVENTION

Testing has demonstrated that trace amounts of Sodalime are capable of reducing cyanide levels in ambient air from 1000 ppm to less than 10 ppm. Sodalime (a commercial preparation composed of >73% Calcium Hydroxide ($Ca(OH)_2$), <5% Potassium Hydroxide (KOH), and <3% Sodium Hydroxide (NaOH)) is a commercially available, nontoxic, inexpensive, granular scavenger for carbon dioxide ($CO_2$) used by anesthesiologists worldwide. The present invention discloses a filtering system for cyanide gas based on the tremendous affinity of Sodalime for gaseous cyanide. Another commercial $CO_2$ scavenger, Baralyme™ (73% Calcium Hydroxide, 11% Barium Hydroxide, 5% Potassium Hydroxide - available from Allied Healthcare Products, Inc. of St. Louis, Mo.) is also effective, although not at the same efficiency level as is Sodalime.

Figure 1:
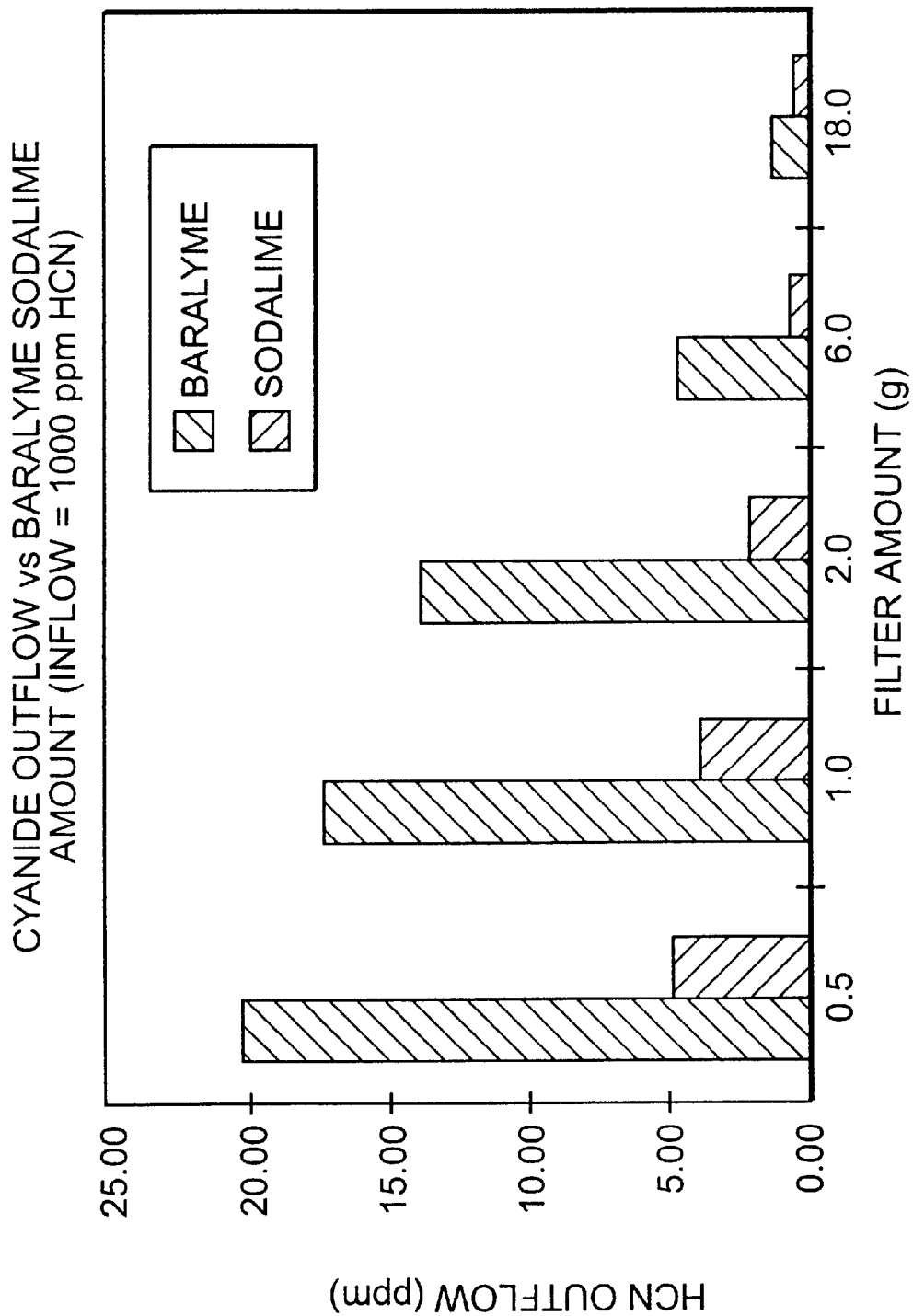
FIG. 1 compares cyanide outflow versus Baralyme™ or Sodalime.

FIG. 1 compares the cyanide outflow when filtered with Baralyme™ with the cyanide outflow when filtered with Sodalime. As shown, when an inflow of 1,000 ppm hydrogen cyanide gas is filtered with one half a gram of Baralyme™, the result is an outflow of 20 ppm hydrogen cyanide gas. However, when the same inflow is treated with one half a gram of Sodalime, the outflow drops to 5 ppm. To achieve the 5 ppm level with Baralyme™, one must use a filter amount of six grams.

While not wishing to be held to any specific mechanism of action, it is believed that the process by which Sodalime or Baralyme™ crystals extract gaseous cyanide from ambient air probably involves conversion either to the solid Calcium Cyanide ($Ca(CN)_2$), Potassium cyanide (KCN), or Sodium Cyanide (NACN) forms. However, this is not meant to be a limitation. The present invention functions to effectively reduce gaseous cyanide from the air. Once cyanide is removed from ambient air, the risk of cyanide toxicity from inhalation diminishes significantly.

Figure 2:
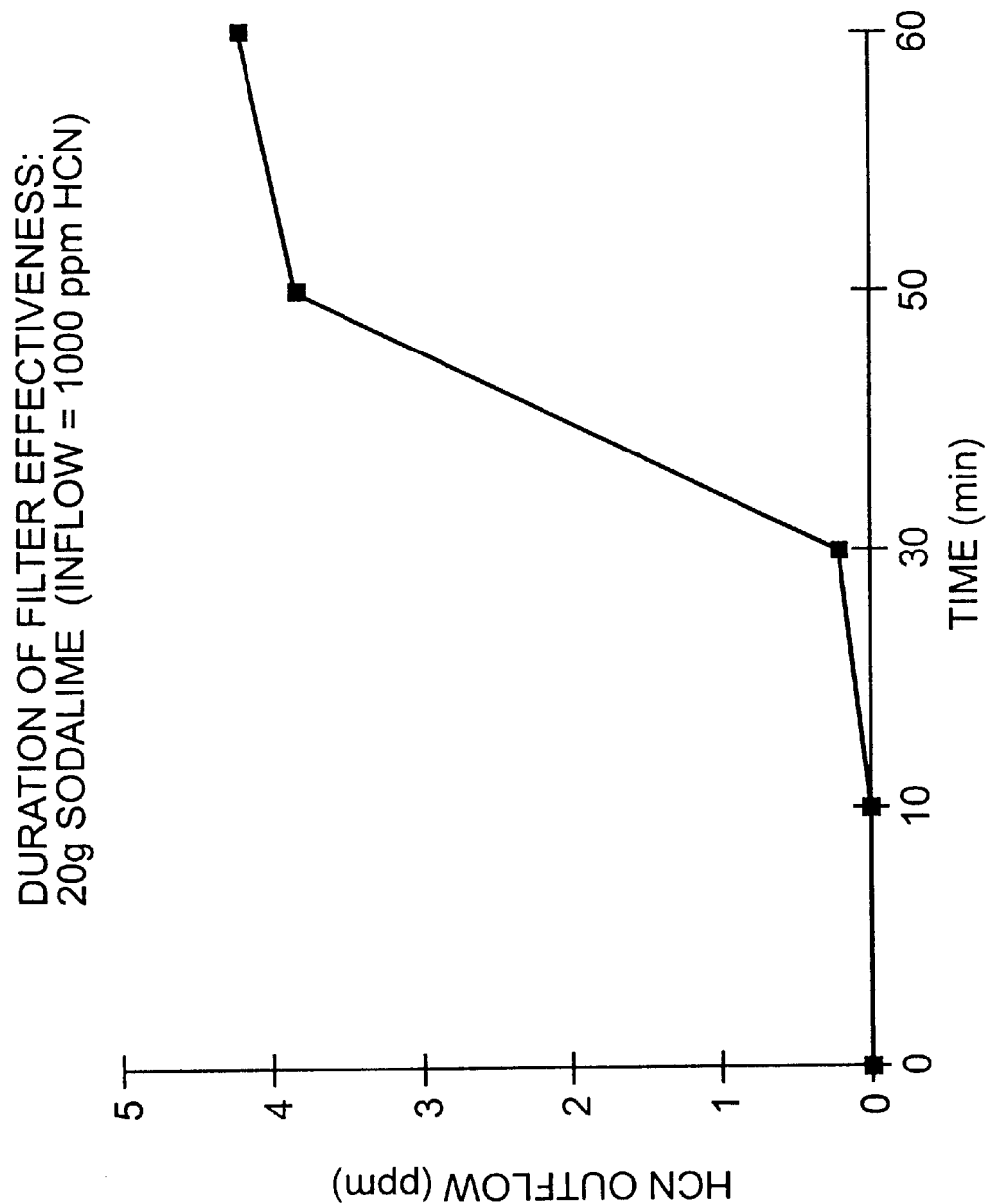
FIG. 2 plots the duration of filter effectiveness.

FIG. 2 plots the duration of filter effectiveness. A trapping apparatus was constructed having a chamber filled with Sodalime absorbent. Air contaminated with cyanide gas was passed through the chamber, and the inflow and outflow of cyanide gas concentrations was measured. The inflow of hydrogen cyanide was 1000 ppm, and 20 grams of Sodalime was used. After 60 minutes the outflow of hydrogen cyanide remained within safe levels; e.g. less than 15 ppm.

Thus, easily managed quantities of Sodalime (50 gm) or Baralyme™ (200 gm) are capable of reducing toxic (1000 ppm) levels of hydrogen cyanide to safe levels (<15 ppm) for up to 1 hour at flow rates compatible with human breathing. Sodalime and/or Baralyme™ can therefore be used as detoxifying agents for cyanide gas. These materials can be used both as direct filters of inhaled air and as general scavenging materials for detoxification of contaminated areas. They can be used in filter systems known in the art for holding filtration in canister, or filtration support media and otherwise.

Figure 3:
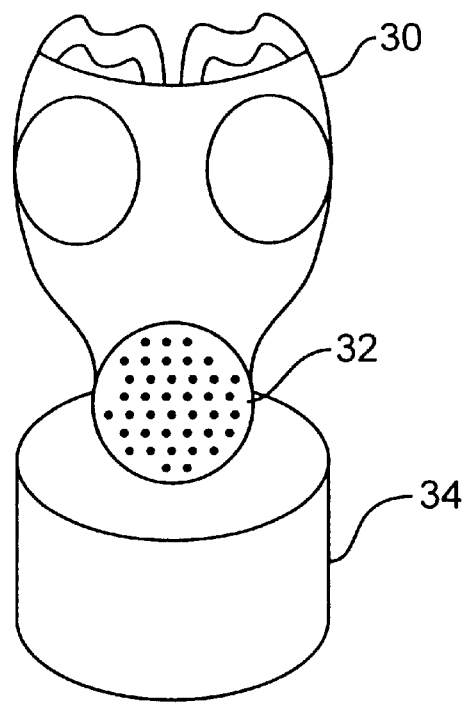
FIG. 3 illustrates a gas mask according to an embodiment of the invention.

This discovery allows "gas masks" to be prepared and worn by those in danger of cyanide poisoning such as miners and fireman to name but two groups. Other industrial applications for such a mask exist wherever cyanide is used together or in combination with other chemicals for industrial processing. Referring to FIG. 3, a generalized gas mask is illustrated. While this notes a particular design, this is not meant as a limitation but only to illustrate the concept of the present invention. Gas mask 30 comprises an mask through which the individual breathes. Air is brought in through intake 32 where it is circulated through a filter media 34, here depicted in a cannister. The media/cannister 34 comprises Sodalime or Baralyme™ for scrubbing cyanide gas.

Figure 4:
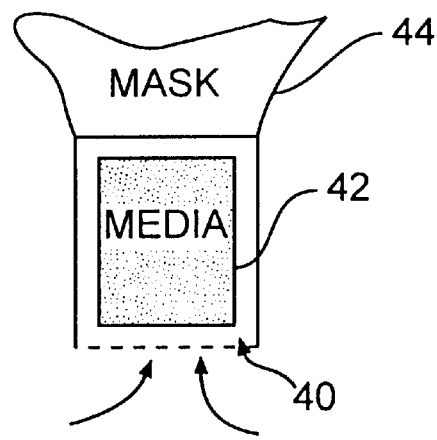
FIG. 4 illustrates a gas mask media structure according to an embodiment of the invention.

Referring to FIG. 4, a generalized gas mask media structure is illustrated. Again contaminated air is breathed in by an individual through intake 40. The air passes through a filter media comprising Sodalime or Baralyme™ 42 where it is scrubbed of cyanide. Thereafter the scrubbed air can be breathed more safely by the wearer of the mask 44.

Figure 5:
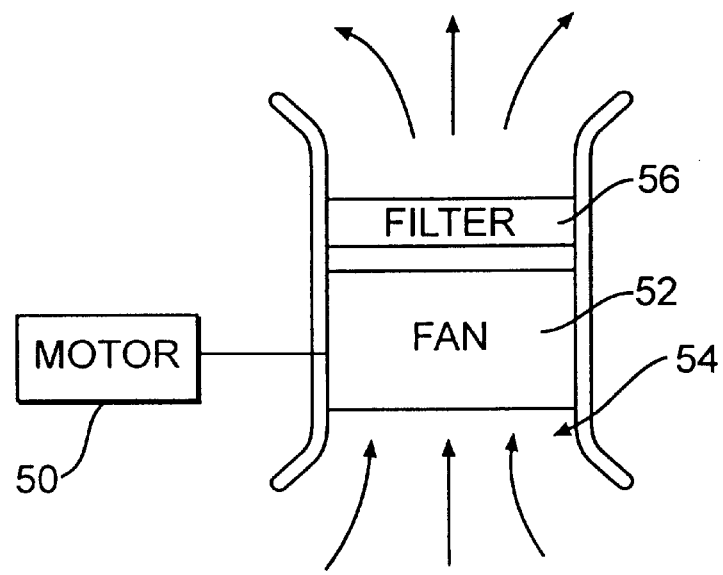
FIG. 5 illustrates an air scrubber according to an embodiment of the invention.

In an alternate embodiment, a large scale air "scrubber" is anticipated that will continuously process air in an environment by sucking air through a filter comprising Sodalime or Baralyme™. Such a system will find use where environmental control regulations require that air be clear before being discharged into the environment. Referring to FIG. 5 a generalized air scrubber is illustrated. A motor 50 drives a fan 52. The fan has an air intake 54 through which contaminated air is brought. The air is then blown by the fan 52 over a filter media, or a series of filter media 56 comprising Sodalime or Baralyme™, where cyanide gas is scavenged from the air and released into the environment with substantially reduced cyanide content.

Figure 6:
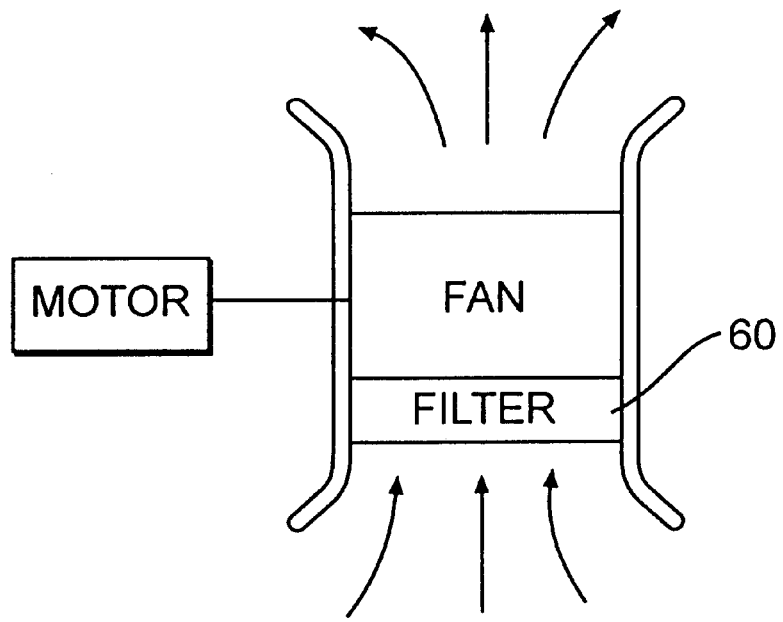
FIG. 6 illustrates an air blower/scrubber according to an embodiment of the invention.

Alternatively, depending on the geometry of the blower/scrubber, air can be brought into a system passing over a Sodalime filter or Baralyme™ filter 60 as illustrated in FIG. 6, scrubbed of cyanide via the filter 60, and released into the environment.

Figure 7:
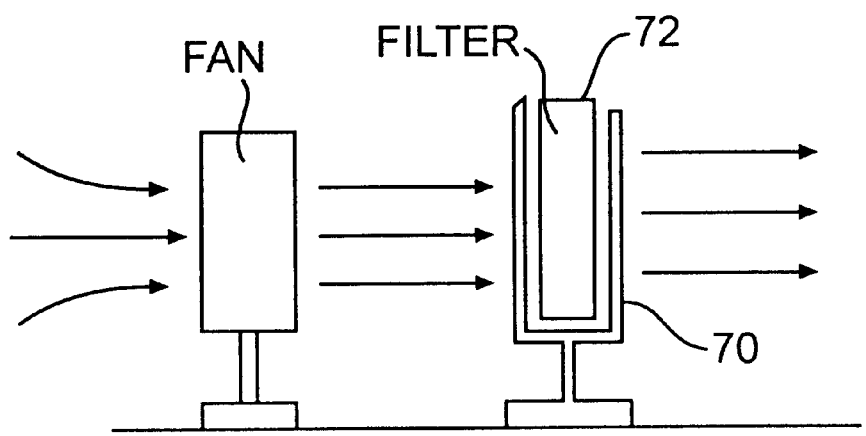
FIG. 7 illustrates a fan and filter stand according to an embodiment of the invention.

In yet another alternate embodiment as illustrated in FIG. 7, a filter stand 70 can be created to hold filers 72 having Sodalime or Baralyme™. Portable fans can simply blow contaminated air through such a filter thereby scrubbing the air and eliminating cyanide gas.

Figure 8:
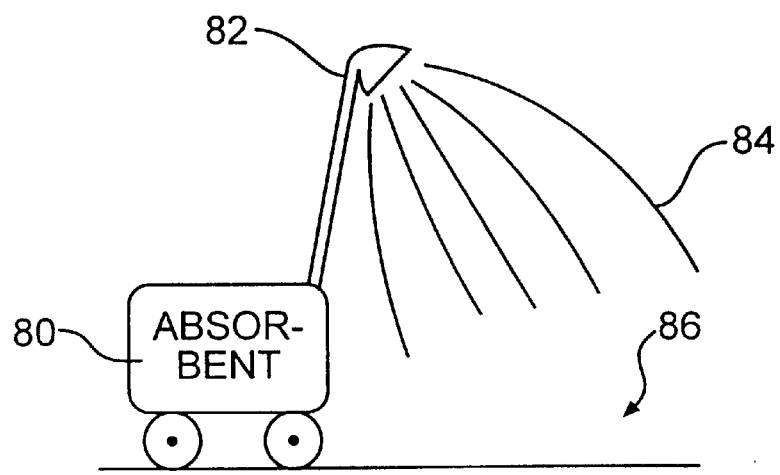
FIG. 8 illustrates an absorbent spray system according to an embodiment of the invention.

FIG. 8 illustrates a generalized absorbent spray system wherein absorbent of the present invention is stored in container 80, sent to sprayer 82 to form an absorbent spray 84 to treat a cyanide contaminated area 86.

Other configurations in addition to those described above are clearly possible, all with the common element of air contaminated with cyanide gas passing through a filter of Sodalime, Baralyme™, or a mixture thereof.

A new system and method for the scavenging of cyanide gas in air has been shown. It will be appreciated by those skilled in the art that other uses of this discovery can be made without departing from the scope of the invention as disclosed. For example, gas masks of airliners and aircraft are easily constructed using the above disclosure and would also afford greater protection for those in aircraft accidents. Other applications of a similar nature are considered within the scope of the present invention.

The present invention has been described in terms of preferred embodiments, however, it will be appreciated that various modifications and improvements may be made to the described embodiments without departing from the spirit and scope of the invention. The scope of the invention is limited only by the appended claims.

What is claimed is:

1. A process for removing cyanide containing gas from air, comprising:
   providing a cyanide scavenging material;
   contacting said air with said cyanide scavenging material; and
   absorbing said cyanide containing gas with said cyanide scavenging material,
wherein the cyanide scavenging material is a combination comprising Calcium Hydroxide, Barium Hydroxide, and Potassium Hydroxide.

2. The process for removing cyanide containing gas from air of claim 1, wherein the cyanide scavenging material is a composition comprising about 73% Calcium Hydroxide, about 11% Barium Hydroxide, and about 5% Potassium Hydroxide.

3. The process for removing cyanide containing gas from air of claim 1, wherein the cyanide scavenging material consists of a combination of (i) Sodalime, and (ii) a composition comprising about 73% Calcium Hydroxide, about 11% Barium Hydroxide, and about 5% Potassium Hydroxide.

4. The process for removing cyanide containing gas from air of claim 1, wherein the contacting step is performed using an apparatus selected from the group consisting of a gas mask, an air blower/scrubber, an absorbent sprayer, and a separable fan/scavenger media combination.

5. The process for removing cyanide containing gas from air of claim 1, wherein toxic levels of cyanide gas are reduced to safe levels for about an hour.

6. A composition for removing cyanide containing gas from air consisting of a combination of (i) Sodalime, and (ii) a composition comprising 73% Calcium Hydroxide, 11% Barium Hydroxide, and 5% Potassium Hydroxide.

7. An apparatus for removing cyanide containing gas from air, comprising:

cyanide scavenging material; and means for contacting said air with said cyanide scavenging material, wherein the cyanide scavenging material is a combination comprising Calcium Hydroxide, Barium Hydroxide, and Potassium Hydroxide.

8. The apparatus for removing cyanide containing gas from air of claim 7, wherein the cyanide scavenging material is a composition comprising about 73% Calcium Hydroxide, about 11% Barium Hydroxide, and about 5% Potassium Hydroxide.

9. The apparatus for removing cyanide containing gas from air of claim 7, wherein the cyanide scavenging material consists of a combination of (i) Sodalime, and (ii) a composition comprising about 73% Calcium Hydroxide, about 11% Barium Hydroxide, and about 5% Potassium Hydroxide.

10. The apparatus for removing cyanide containing gas from air of claim 7, wherein the means for contacting is selected from the group consisting of a gas mask, an air blower/scrubber, an absorbent sprayer, and a separable fan/scavenger media combination.

* * * * *